US011321843B1

(12) United States Patent
Harkness et al.

(10) Patent No.: US 11,321,843 B1
(45) Date of Patent: May 3, 2022

(54) ADAPTIVE MACHINE LEARNING SYSTEM FOR IMAGE BASED BIOLOGICAL SAMPLE CONSTITUENT ANALYSIS

(71) Applicant: Rewire Neuro, Inc., Portland, OR (US)

(72) Inventors: John Hoehn Harkness, Portland, OR (US); Grant W. Wade, Ridgefield, WA (US); William M. O'Keeffe, Portland, OR (US); Robert Pascal Harkness, Medford, OR (US); Colton V. King, Washougal, WA (US); Kristy Jo Lawton, Portland, OR (US)

(73) Assignee: Rewire Neuro, Inc., Portland, OR (US)

( * ) Notice: Subject to any disclaimer, the term of this patent is extended or adjusted under 35 U.S.C. 154(b) by 0 days.

(21) Appl. No.: 17/136,455

(22) Filed: Dec. 29, 2020

(51) Int. Cl.
| | | |
|---|---|---|
| G06K 9/00 | (2006.01) | |
| G06T 7/00 | (2017.01) | |
| G06N 20/00 | (2019.01) | |
| G06T 7/70 | (2017.01) | |
| G06T 7/90 | (2017.01) | |
| G06T 11/00 | (2006.01) | |
| G06K 9/62 | (2022.01) | |
| G10L 15/22 | (2006.01) | |
| G10L 15/26 | (2006.01) | |
| G06T 7/20 | (2017.01) | |

(52) U.S. Cl.
CPC .......... *G06T 7/0014* (2013.01); *G06K 9/6256* (2013.01); *G06N 20/00* (2019.01); *G06T 7/20* (2013.01); *G06T 7/70* (2017.01); *G06T 7/90* (2017.01); *G06T 11/00* (2013.01); *G10L 15/22* (2013.01); *G10L 15/26* (2013.01); *G06T 2200/24* (2013.01); *G06T 2207/10016* (2013.01); *G06T 2207/20081* (2013.01); *G06T 2207/30024* (2013.01)

(58) Field of Classification Search
CPC .......... G06T 7/0014; G06T 7/20; G06T 7/70; G06T 7/90; G06T 11/00; G06T 2200/24; G06T 2207/10016; G06T 2207/20081; G06T 2207/30024; G06K 9/6256; G06N 20/00; G10L 15/22; G10L 15/26
USPC ....................................................... 382/133
See application file for complete search history.

(56) References Cited

U.S. PATENT DOCUMENTS

| | | | |
|---|---|---|---|
| 2005/0213090 A1* | 9/2005 | Namba | G01N 21/6408 356/318 |
| 2017/0270346 A1* | 9/2017 | Ascierto | G06K 9/00134 |
| 2020/0250817 A1* | 8/2020 | Leng | G16H 50/20 |
| 2021/0150701 A1* | 5/2021 | Thagaard | G06K 9/6259 |
| 2021/0327564 A1* | 10/2021 | Ferreira | G16H 30/20 |
| 2021/0383091 A1* | 12/2021 | Bredno | G16H 30/40 |

* cited by examiner

*Primary Examiner* — Charlotte M Baker (74) *Attorney, Agent, or Firm* — Lee & Hayes, P.C.

(57) ABSTRACT

Systems and methods for image-based biological sample constituent analysis are disclosed. For example, image data corresponding to an image having a target constituent and other constituents may be generated and utilized for analysis. The systems and processes described herein may be utilized to differentiate between portions of image data corresponding to the target constituent and other portions that do not correspond to the target constituent. Analysis of the target constituent instances may be performed to provide analytical results.

20 Claims, 8 Drawing Sheets

ADAPTIVE MACHINE LEARNING SYSTEM FOR IMAGE BASED BIOLOGICAL SAMPLE CONSTITUENT ANALYSIS

BACKGROUND

Analysis of biological images is an integral part of many fields, including human and veterinary medicine, forensics, biotechnology research and development, and academic research. Throughout the world, professionals in these biological fields examine a diverse range of cell types and microorganisms, where rapid identification and quantification is crucial for appropriate diagnoses and treatment, as well as accurate research conclusions and therapeutic development. Described herein are improvements in technology and solutions to technical problems that can be used to, among other things, detect target constituents in biological samples.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Systems and methods for image-based biological sample constituent analysis are disclosed. Take, for example, a methodology and configuration to detect and quantify biologically-relevant sample constituents. This novel method improves biomedical research reproducibility and clinical diagnostic quality by developing a cloud-based, artificial intelligence web service that delivers computer vision for biomedical images to remote research and clinical users. This system can provide integration of cloud-based, computer vision capability into diagnostic devices and software through an intuitive AI-as-a-Service model. The result is a client hardware-agnostic service that provides quick, easy, and accurate analysis of biomedical specimens and/or samples, which surpasses an individual's capability to detect biomedical targets without introducing bias and/or errors and improves the reproducibility of analysis. As briefly described in the background section above, this disclosed system is capable of detecting many classes of cellular and/or biomedical targets within user uploaded images. However, the accuracy of target detection relies on familiarity of the computer vision model with the target. The system allows for user interactions to correct algorithm-generated constituent annotations immediately after presentation and may result in the automatic generation, refinement, and wide-scale deployment of computer vision algorithms.

Optical analysis of targets within tissue samples, cultures, and/or specimens is fundamental to detecting biological properties, including protein interactions within the central nervous system, sperm counts, digestive-system parasites, and immune response to viral infections such as COVID-19. For example, the technology may identify abnormal cells in biopsied cancer tissue in a clinical laboratory, quantify neurons within brain slices in an academic research lab, and detect parasites in fecal samples in an agricultural setting. These varied applications also utilize a wide range of imaging technologies, including simple light microscopes and/or high-resolution fluorescent microscopes, and increasingly, portable attachments for field and/or home use with smartphones and/or other specialized handheld devices. Unfortunately, despite incredible advances in computational technologies in recent years, many datasets still rely heavily on human hand-scoring from visual analysis. Problematically, human analysis is labor intensive and prone to variability and error.

Improvements in computational power have fostered research-grade software development for user-focused histological and pathological analysis, such as features that attempt automated cellular detection. However, few software solutions have proven capable of automating constituent detection, and there are no examples in the art for a system that is capable of automatic incorporation of new classes of biological constituents in the generation, refinement, and wide-scale deployment of computer vision algorithms.

Image analysis technology may utilize human interaction to identify biomarker targets. This bottleneck is a high priority and well-suited for application of pre-trained machine learning image processing and integrated transfer learning capability. Prior software requires users to train their own computer vision algorithms and does not provide remotely hosted computational servers or databases. Other solutions provide limited computer vision capability, and are not tailored for high-throughput cell counting or co-localization analysis performed on distributed systems. Still other programs are not capable of integrating constituent analysis into distributed client systems or adapting detection algorithms for inclusion of newly encountered classes of biological constituents.

It is accepted in the art that there is significant need for an image analysis platform that offers accurate automated biomarker detection for photomicrographs. This technology is an adaptive, high throughput biomedical image analysis platform that quickly and accurately identifies and quantifies biomarker targets. The presently disclosed web service fits into any image analysis workflow, including real-time constituent detection, $3^{rd}$-party diagnostic device integration, and high-powered, web-available analysis, with cloud data synchronization between other installations. The platform delivers a powerful new tool for biomedical research and clinical diagnostics that will accelerate progress in improving human health.

Accordingly, there is a need in the art for a methodology and remote computational system coupled to an adaptive artificial intelligence for computer vision that is capable of automatically detecting known and previously unknown constituents in biological samples with accuracy and precision. Such an adaptive, remote computer vision platform and methodology addresses the need for accurate methods to automate high-throughput biomarker quantification in tissue samples.

User-assisted annotations represent a valuable and rare data source, which can be leveraged to 1) improve detection algorithms, 2) generate new detection algorithms, and 3) generate new customer-specific detection algorithms. Additionally, the system establishes a "feedback loop" where near real-time information about target detection accuracy is provided to image acquisition hardware or software. Together, an automatic system for an adaptable computer vision system has the potential to rapidly improve cellular image analysis for accurate target detection in an ever-evolving biomedical landscape. This system can be a valuable building block to many different types of machine learning systems.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

Figure 1:
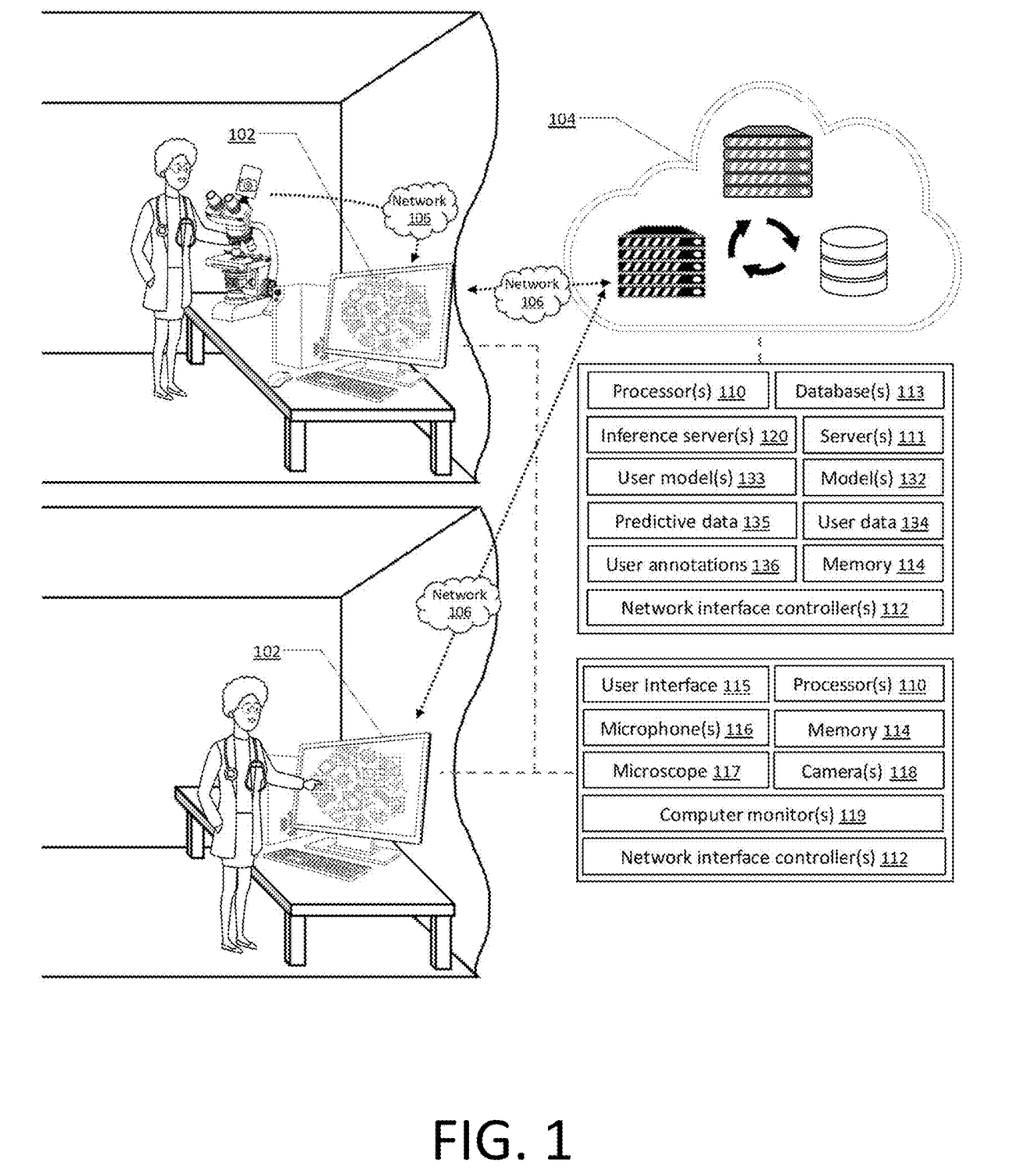
FIG. 1 illustrates a schematic diagram of an example environment for image-based biological sample constituent analysis.

FIG. 1 illustrates a schematic diagram of an example system 100 for image-based biological sample constituent analysis. The system 100 may include, for example, microscope(s) 117.

Figure 4:
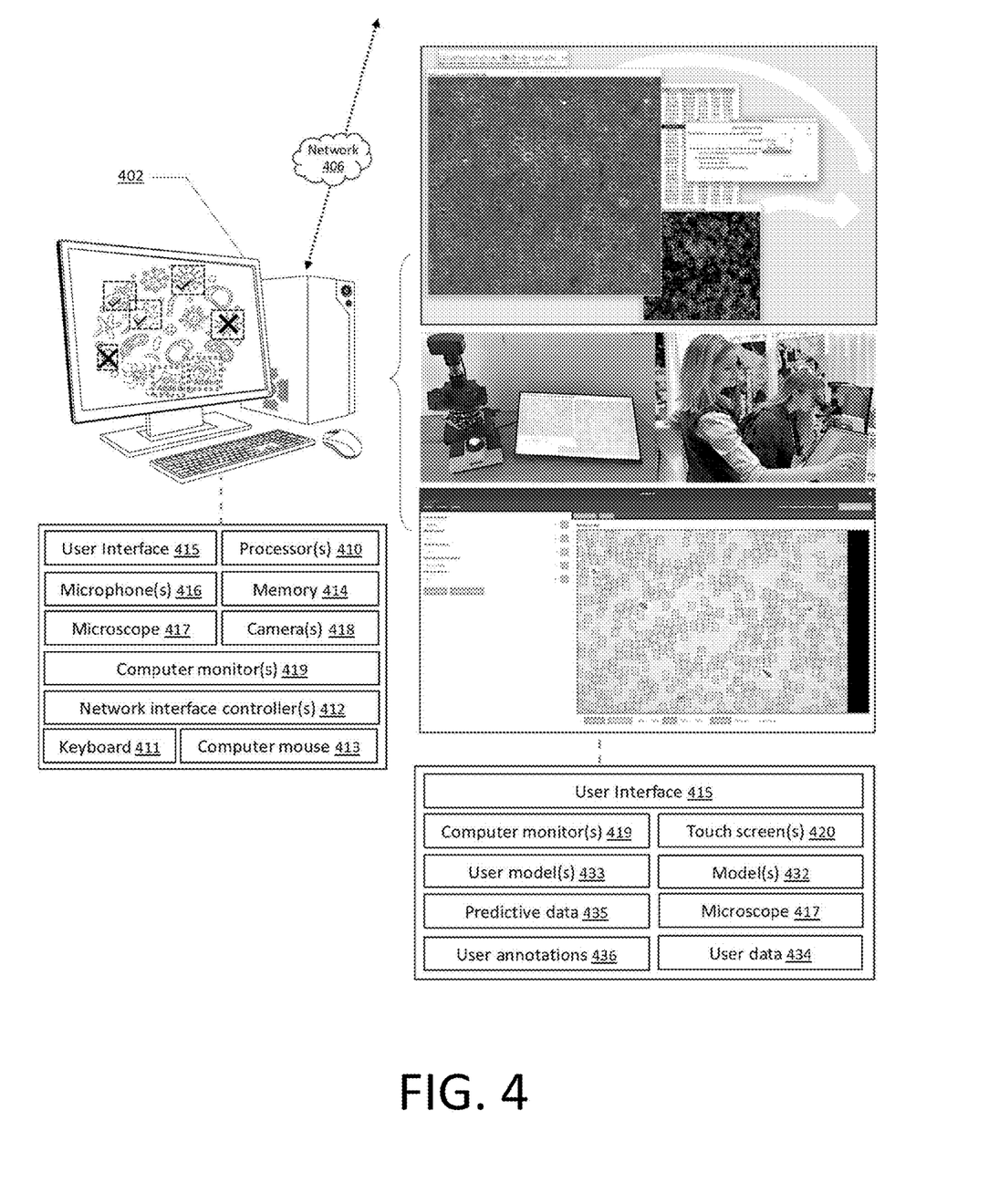
FIG. 4 illustrates a conceptual diagram of example components of a device that may be utilized in association with image-based biological sample constituent analysis.

In FIG. 1, the electronic devices 102 may include one or more components, such as, for example, one or more processors 110, one or more network interfaces 112, memory 114, locally or remotely generated graphical user interface 115 (as illustrated in FIG. 4), one or more microphone(s) 116, attached microscope 117 or optical slide-reader hardware for image-based biological sample constituent analysis, including one or more camera(s) 118 attached via network connections 112, and a computer monitor (touch sensitive or not) 119.

The remote system 104 may include components such as, for example, web server(s) 111 and inference server(s) 120, incorporating one or more processors 110, network interface controllers 112, and databases 113. The remote system 104 may include inbound and outbound data interfaces for computational processing of user data 134, return of predictive data 135, and computational processing of user annotations 136.

Figure 5:
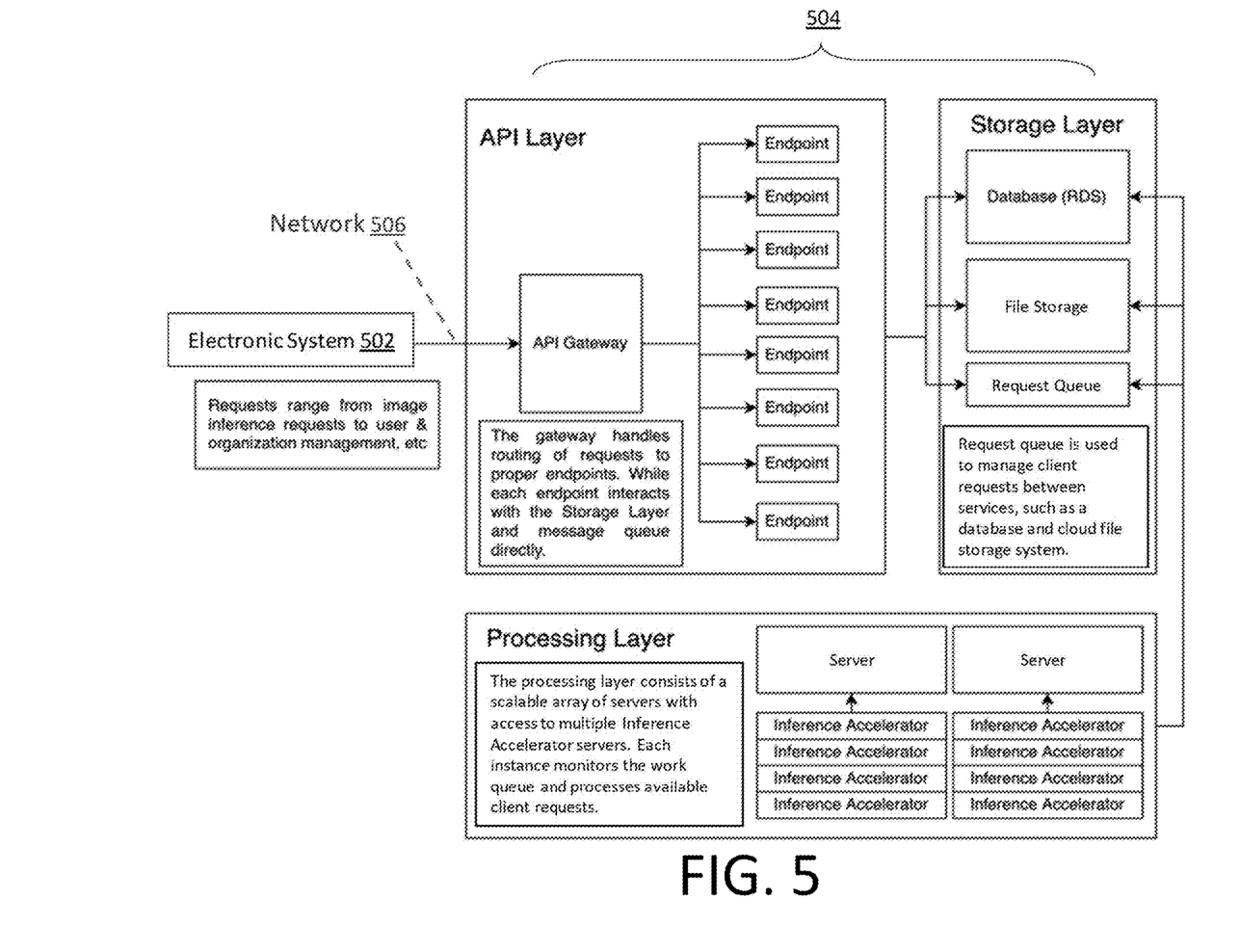
FIG. 5 illustrates a conceptual diagram of example processes and a relationship flow for image-based biological sample constituent analysis.

FIGS. 1 and 5 illustrate an Application Programming Interface (API) Gateway that can function as the client entry point to the web service from the electronic device 102 to the remote system 104, which allows remote services to be called over a network 106 when a server endpoint (as illustrated in FIG. 5) may invoke. Server 111 functions can be called by the API Gateway and the function can interact with other downstream services. User credentialing and access can be managed by a license registry hosted on the remote system 104 servers 111 and databases 113. In-memory cache 114 can queue inference requests and signal request completion. Virtual server 111 instances with dedicated inference servers 111 may be used for running predictive models 132. These server instances 111 can manage the work queue and run predictive model 132 inference, returning results to the cloud database 113 storage. This component of the remote system 104 software stack can use an instance scaling strategy that guarantees that present remote system 104 resources in distributed geographic areas provide return requests quickly, without using excess resources.

User data 134, such as images or micrographs of biological sample, can be associated with user-provided metadata, predictive data 135, and user annotations 136 through relational database 113 and stored for future uses, such as training and improvements to models 132. User metadata, as a type of user data 134, may be comprised of user-provided information, such as image composition descriptors, file names, sample names, sample types, sample compositions, and others. A backend relational database 113, or other data storage architectures such as non-relational databases and data lakes, can store user data 134, such as image locations, constituent annotations, metadata, user identity information, and organization information. The database 113 component of the stack can also scale to meet demand, without needing to scale back when demand subsides. This allows replication of user data 134, models, 132, user models 133, predictive data 135, and user annotations 136 to multiple remote system 104 data centers throughout the world, providing redundancy and better performance for remote users.

Following a user's image transmission to the remote system 104 from the electronic device 102, and model 132 inference, the image and resulting user data 133 may be sent to the database 113. Each user image can contain hundreds or thousands of instances of predictive data 135, with coordinates describing the outline of the constituent detection, which may be stored in a table linked to the model 132 used to generate the annotations 135. This record can also link to tables identifying image metadata, constituent co-localizations, user data 134, and quantification results. The database 113 may be robust enough to support detailed experimental research obtained from users, and also flexible enough to store image data resulting from API use by metadata-poor, or patient-protected sources. In the case of human samples, records can be encrypted and stored securely in HIPAA-approved secure server environments, stripped of all protected health information (PHI). Security can be provided at every level of user organization to enable data protection and regulate data sharing.

The models 132 described herein may utilize predictive analytics to predict one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases 113 and may be utilized to predict trends and behavior patterns. In examples, the event, otherwise described herein as an outcome, may be an event that may occur in the future, such as whether presence may be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

It should be noted that while image data may be described as a type of data utilized to communicate between various components of the remote system 104 and/or other systems and/or devices, the components of the remote system 104 may use any suitable format of data to communicate. For example, the data may be in a human-readable format, such as text data formatted as XML, SSML, and/or other markup language, and/or in a computer-readable format, such as binary, hexadecimal, etc., which may be converted to text data for display by one or more devices such as the devices 102.

As shown in FIG. 1, several of the components of the remote system 104 and the associated functionality of those components as described herein may be performed by one or more of the electronic devices 102 and/or personal devices. Additionally, or alternatively, some or all of the components and/or functionalities associated with the electronic devices 102 and/or personal devices may be performed by the remote system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices can be associated with a first user account and another of the devices can be associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the remote system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the remote system 104 may include more or more graphics processing units (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 104 may possess its own local memory, which also may store program components, program data, and/or one or more operating systems.

The memory 114 and/or the memory described with respect to the components of the remote system 104 may include volatile and nonvolatile memory, removable and non-removable media implemented in any method or technology for storage of information, such as computer-readable instructions, data structures, program component, or other data. Such memory 114 and/or the memory described with respect to the components of the remote system 104 may include, without limitations, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the remote system 104 may be implemented as computer-readable storage media ("CRSM"), which may be any available physical media accessible by the processor(s) 110 and/or the processor(s) described with respect to the remote system 104 to execute instructions stored on the memory 114 and/or the memory described with respect to the components of the remote system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the remote system 104, discussed herein may include at least one operating system (OS) component that can configure to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112 and/or the network interface(s) described with respect to the components of the remote system 104 may enable messages between the components and/or devices shown in system 100 and/or with one or more other polling systems, as well as other networked devices. Such network interface(s) 112 and/or the network interface(s) described with respect to the components of the remote system 104 may include one or more network interface controllers (NICs) or other types of transceiver devices to send and receive messages over the network 106.

For instance, each of the network interface(s) 112 and/or the network interface(s) described with respect to the components of the remote system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or the network interface(s) described with respect to the components of the remote system 104 may include a wide area network (WAN) component to enable message over a wide area network.

In some instances, the remote system 104 may be local to an environment associated the electronic devices 102 and/or personal devices. For instance, the remote system 104 may be located within one or more of the electronic devices 102 and/or personal devices. In some instances, some or all of the functionality of the remote system 104 may be performed by one or more of the electronic devices 102 and/or personal devices. Also, while various components of the remote system 104 have been labeled and named in this disclosure and each component has been described as being configured to cause the processor(s) to perform certain operations, it should be understood that the described operations may be performed by some or all of the components and/or other components not specifically illustrated.

Figure 8:
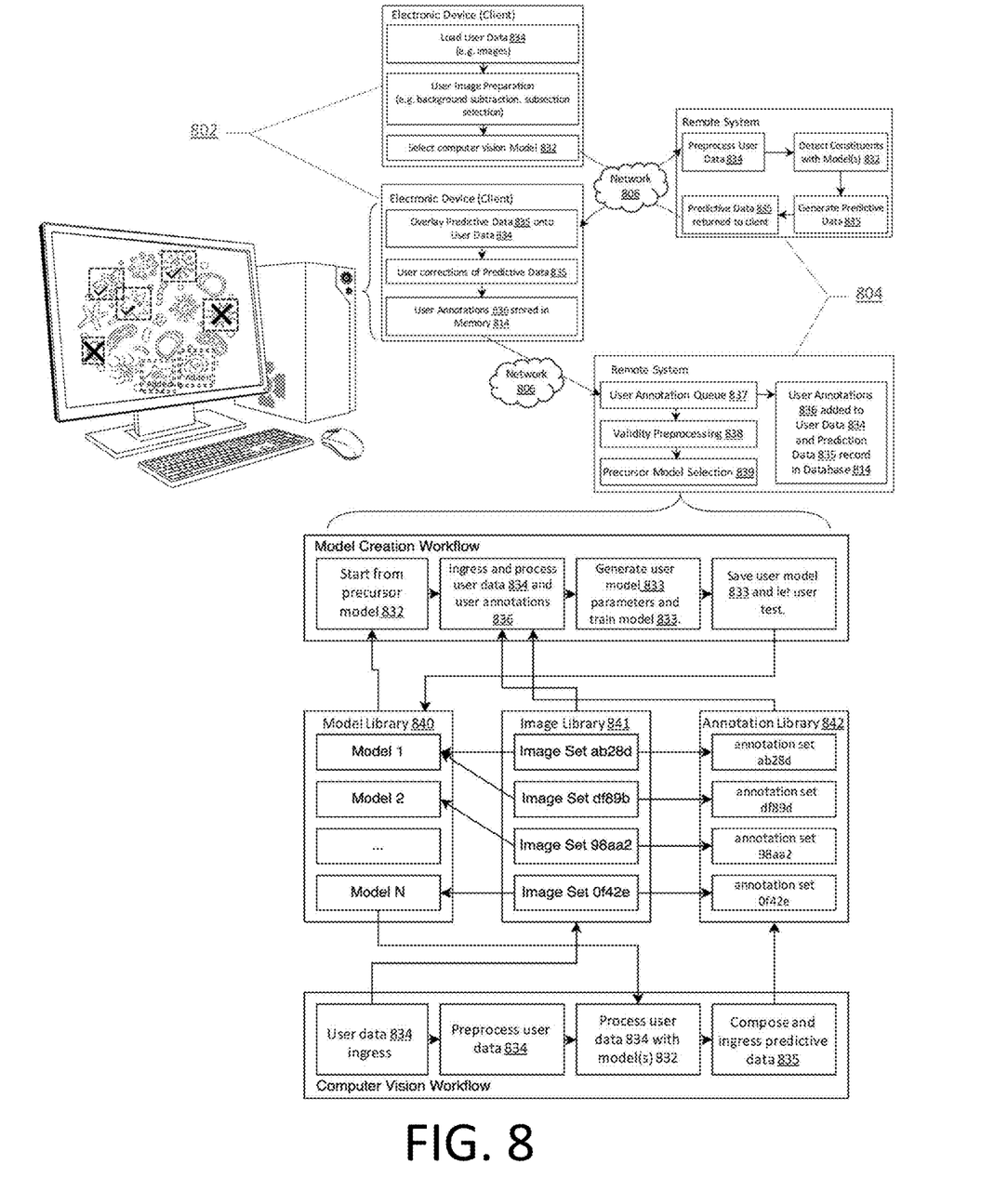
FIG. 8 illustrates a conceptual diagram of example processes between devices and systems and a relationship flow for incorporation of annotations for the adaption of models during image-based biological sample constituent analysis.

Data analysis may include using one or more models 132, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models 132. Thereafter, predictive modelling may be performed to generate accurate predictive models for future events (as illustrated in FIG. 8). Outcome prediction may be deterministic such that the outcome can be determined to occur or not occur. Additionally, or alternatively, the outcome prediction may be probabilistic such that the outcome can be determined to occur to a certain probability and/or confidence.

Figure 2:
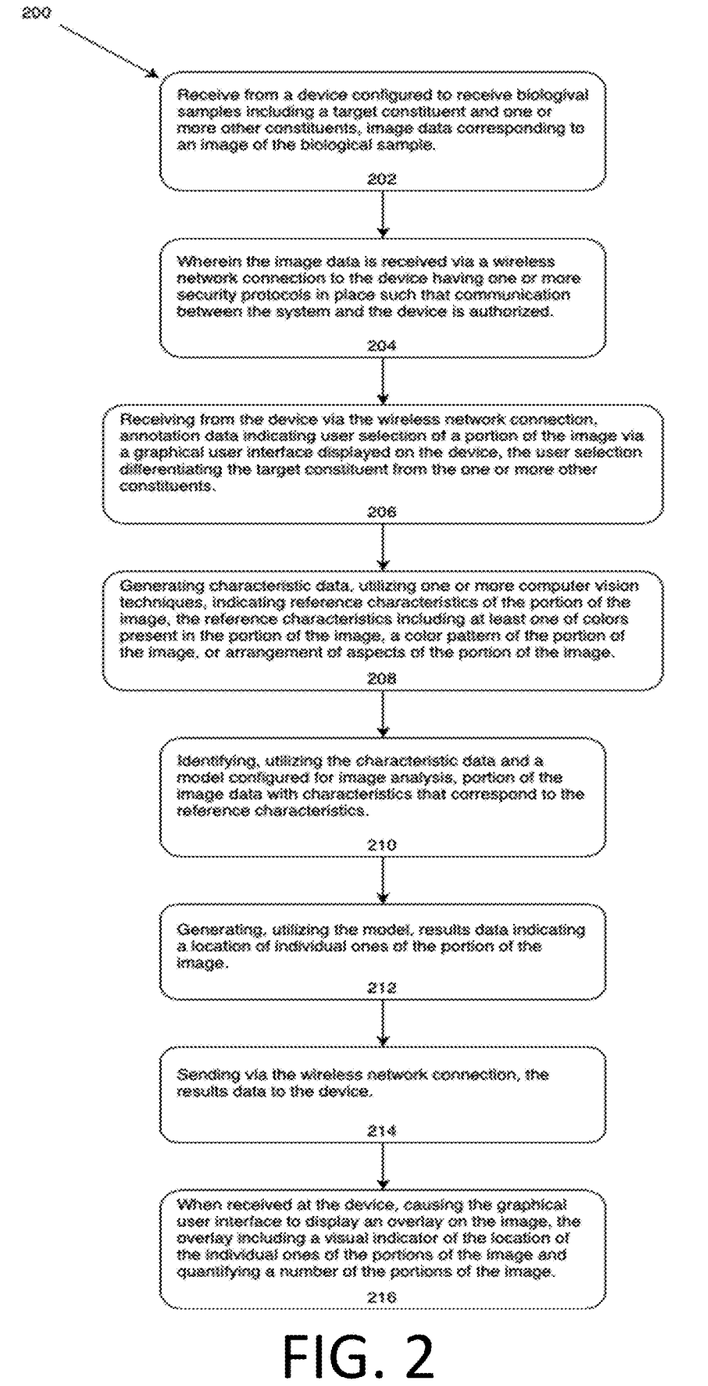
FIG. 2 illustrates a flow diagram of an example process for image-based biological sample constituent analysis.
Figure 3:
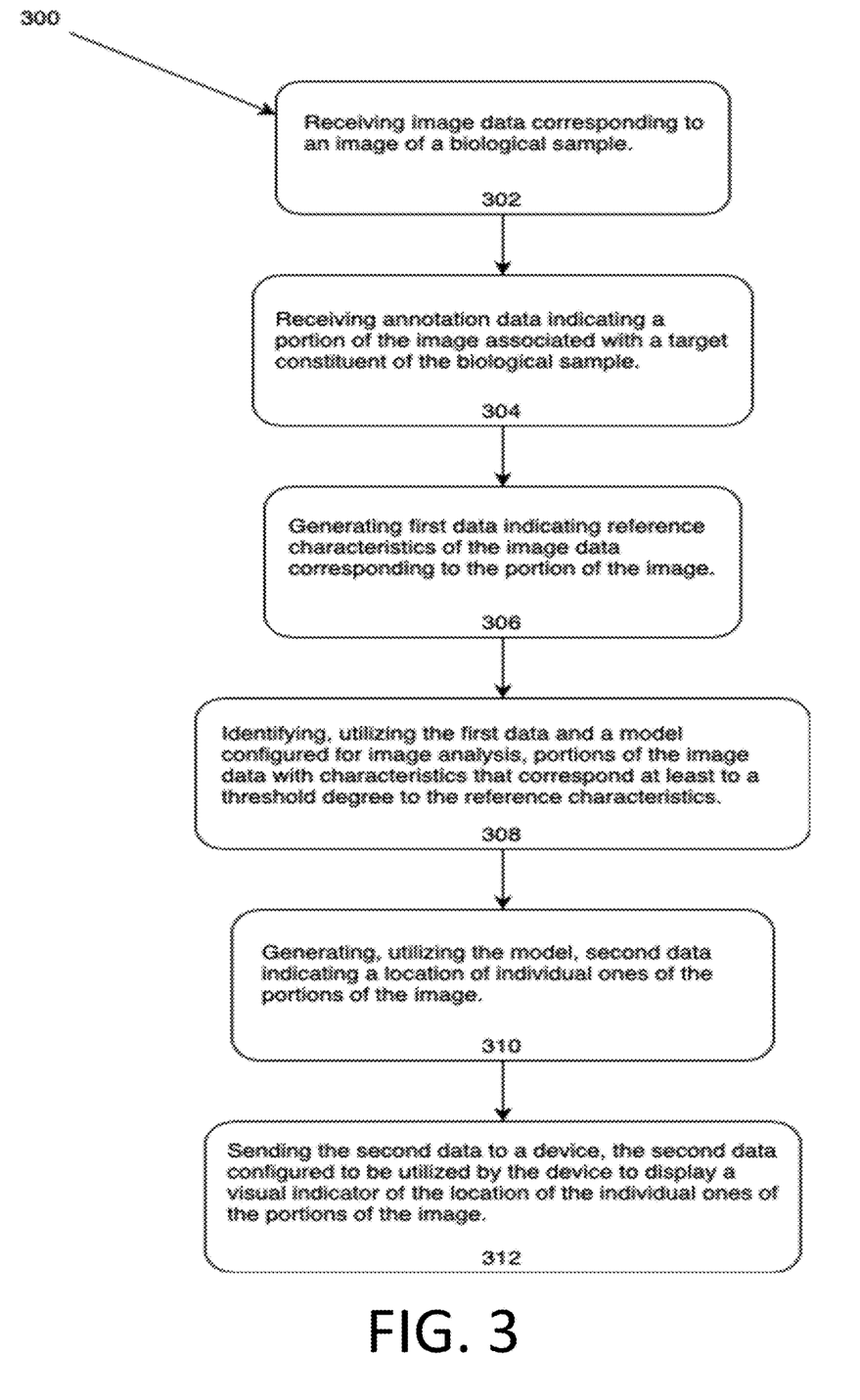
FIG. 3 illustrates a flow diagram of another example process for image-based biological sample constituent analysis.

FIGS. 2 & 3 illustrate processes for image-based biological sample constituent analysis. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 4-8, although the processes may be implemented in a wide variety of other environments, architectures and systems.

FIG. 2 illustrates a flow diagram of an example process 200 for image-based biological sample constituent analysis.

At block 202, the process 200 may include receiving from a device configured to receive biological samples including a target constituent and one or more other constituents, image data corresponding to an image of the biological sample. For example, the device may include a camera that may be configured to zoom in to a biological sample and capture one or more images of the sample. The target constituent may be any constituent that someone operating the device or another person associated with the sample may be interested in identifying from the sample. The other target constituents may be other components of the sample that are not the target constituent. The image data may be generated by the device and may be sent, for example, to a remote system via a network.

At block 204, the process 200 may include image data received via a network connection to the device having one or more security protocols in place such that communication between the system and the device can be authorized. For example, the device may send image data to the system for constituent analysis using machine learning models hosted on the system. The image data may be accompanied by, and associated with, other user data, specific to the image data.

At block 206, the process 200 may include receiving from the device via the network connection, annotation data indicating user selection of a portion of the image via a graphical user interface displayed on the device, the user selection differentiating the target constituent from the one or more other constituents. For example, data specific to the user may be received from the device, and may include image data, model selection, image metadata, and other data directing analysis.

At block 208, the process 200 may include generating characteristic data, utilizing one or more computer vision techniques, indicating reference characteristics of the portion of the image, the reference characteristics including at least one of colors present in the portion of the image, a color pattern of the portion of the image, and/or arrangement of aspects of the portion of the image. For example, image data can be preprocessed by the system to remove extraneous image data, select targeted image data, improve image data, subdivide large images for processing, and/or improve the accuracy of target constituent detection. In this example, improved target detection accuracy may result from removing color channels outside of the targeted frequency, and/or removing areas of the image outside of the targeted region.

At block 210, the process 200 may include identifying, utilizing the characteristic data and a model configured for image analysis, portion of the image data with characteristics that correspond to the reference characteristics. For example, machine learning models used in this computer vision application may be designed to detect characteristic edges and/or features of the targeted constituents. Edges and features used in detection may be determined algorithmically during the process of "deep learning" by a convolutional neural network, and/or other machine learning methods and architectures. Machine learning models may be developed through demonstration of edges and features that are characteristic of the targeted classes of constituent. Developed models may then accurately detected these characteristic features in previously unseen examples of the targeted constituents, and result in predictive data that may include the locations, classifications, and/or other identities of the target constituents.

At block 212, the process 200 may include generating, utilizing the model, results data indicating a location of individual ones of the portion of the image. For example, the system may predict the locations, classifications, and/or other identities of the target constituents, and automatically generate a file of the predictive data, which may be stored on the system and transmitted to the device.

At block 214, the process 200 may include sending via the wireless network connection, the results data to the device. For example, an image processed on the remote system, resulting in predictive data that may be stored in memory on the system. Additionally, predictive data may be returned to the device for overlay on the user interface and further instruction from the user.

At block 216, the process 200 may include receiving data at the device, causing the graphical user interface to display an overlay on the image, the overlay including a visual indicator of the location of the individual ones of the portions of the image and quantifying a number of the portions of the image. For example, predictive data resulting image analysis by from machine learning models on the remote system could indicate the predicted location, predicted classifications, and/or other predicted data of image constituents. These data can be displayed on the user interface by graphically representing the predicted information as an overlay on the user image. In this example, the user may then have the ability to alter the predicted data for accuracy and/or preference.

Additionally, or alternatively, the process 200 may include generating a JavaScript object notation (JSON) file corresponding to the annotation data. In these examples, generating the characteristics data may include generating a feature formatted for input into the model utilizing the JSON file.

Additionally, or alternatively, the process 200 may include selecting a machine learning model from one or more machine learning models based at least in part on data received from the device being image data instead of other data types. In these examples, generating a training dataset may be based at least in part on the characteristic data, and/or on the training dataset such that a trained machine learning model may be generated. Furthermore, generating a testing dataset may correspond to the image data, and generating the results data may be based at least in part on the trained machine learning model utilizing the testing dataset.

Additionally, or alternatively, the process 200 may include receiving, from the device and via the wireless network connection, feedback data indicating an accuracy of the results data as determined by a user of the device. For example, generating a training dataset may be based at least in part on the feedback data, the training dataset such that a trained model may be generated, receiving additional image data for analysis of the target constituent, and/or analyzing the additional image data utilizing the trained model instead of the model.

FIG. 3 illustrates a flow diagram of an example process 300 for image-based biological sample constituent analysis.

At block 302, the process 300 may include receiving image data corresponding to an image of a biological sample. For example, an image of a biological sample may include one or more images of the sample. The target constituent may be any constituent that someone conducting the analysis or another person associated with the sample may be interested in identifying from the sample. The other target constituents may be other components of the sample that are not the target constituent. The image data may be generated by the device and may be sent, for example, to a remote system via a network.

At block 304, the process 300 may include receiving annotation data indicating a portion of the image associated with a target constituent of the biological sample. For example, data specific to the user may be received from the device, and may include image data, model selection, image metadata, and other data directing analysis.

At block 306, the process 300 may include generating first data indicating reference characteristics of the image data corresponding to the portion of the image. For example, a user may select exemplary instances of the target constituent, by drawing a box around the target, painting the target with a coded mask, and/or otherwise identifying the location, classification, and/or other data of the constituent. This process may include generating a JavaScript object notation (JSON) file corresponding to the annotation data. In these examples, generating the characteristics data may include generating a feature formatted for input into the model utilizing the JSON file.

At block 308, the process 300 may include identifying, utilizing the first data and a model configured for image analysis, portions of the image data with characteristics that correspond at least to a threshold degree to the reference characteristics. In these examples, generating a training dataset may be based at least in part on the characteristic data, and/or on the training dataset such that a trained machine learning model may be generated. Furthermore, generating a testing dataset may correspond to the image data, and generating the results data may be based at least in part on the trained machine learning model utilizing the testing dataset.

At block 310, the process 300 may include generating, utilizing the model, second data indicating a location of individual ones of the portions of the image. For example, generating a training dataset may be based at least in part on the feedback data, the training dataset such that a trained model may be generated, receiving additional image data for analysis of the target constituent, and/or analyzing the additional image data utilizing the trained model instead of the model.

At block 312, the process 300 may include sending the second data to a device, the second data configured to be utilized by the device to display a visual indicator of the location of the individual ones of the portions of the image. For example, predictive data resulting image analysis by from machine learning models on the remote system could indicate the predicted location, predicted classifications, and/or other predicted data of image constituents. These data can be displayed on the user interface by graphically representing the predicted information as an overlay on the user image. In this example, the user may then have the ability to alter the predicted data for accuracy and/or preference.

Additionally, or alternatively, the process 300 may include generating a JavaScript object notation (JSON) file corresponding to the annotation data. In these examples, generating the characteristics data may include generating a feature formatted for input into the model utilizing the JSON file.

Additionally, or alternatively, the process 300 may include selecting a machine learning model from one or more machine learning models based at least in part on an identifier of the target constituent. In this example, generating a training dataset may be based at least in part on the characteristic data, training dataset such that a trained machine learning model may be generated, and wherein generating the second data may be performed utilizing the trained machine learning model.

Additionally, or alternatively, the process 300 may include receiving feedback data indicating an accuracy of the second data. For example, generating a training dataset may be based at least in part on the feedback data, training dataset such that a trained model may be generated, and/or analyzing additional image data utilizing the trained model instead of the model.

Additionally, or alternatively, the process 300 may include generating text data from the audio data. In this example, the text data corresponding to a textual representation of user speech from the audio data, and determining the reference characteristics based at least in part on the text data.

Additionally, or alternatively, in the process 300, image data may represent multiple sequential images of the biological sample. For example, the reference characteristics may indicate at least one of a type of movement and/or a degree of movement of the target constituent, and the second data indicates identification of the portions of the image data with target constituents having the at least one of the type of movement and/or the degree of movement.

Additionally, or alternatively, in process 300, the target constituent may comprise a first target constituent, the annotation data indicates the first target constituent and a second target constituent. The method may further comprise identifying, utilizing the first data and the model, second portions of the image data corresponding to the second target constituent, and wherein the second data differentiates between a location of individual ones of the second portions of the image data and the location of the individual ones of the first portions of the image data.

Additionally, or alternatively, the process 300 may include generating a model library configured to store models for analysis of target constituents. In this example, the model may be stored in the model library in association with an identifier of the target constituent.

Additionally, or alternatively, the process 300 may include generating an interface configured to receive search queries for the models in the model library. In this example, a search query may be received to indicate a request for analysis of reference image data for the target constituent, identify a device from which the search query was received. The model may be being configured to analyze the reference image data for the target constituent.

FIG. 4 illustrates a schematic diagram of an example user interface 415 for image-based biological sample constituent analysis. The user interface, as described in FIG. 4, may be displayed on computer monitor(s) 419, touch-sensitive computer screens 420, and/or microscope objectives 417.

In FIG. 4, the electronic devices 402 may include one or more components, such as, for example, one or more processors 410, one or more network interfaces 412, memory 414, locally or remotely generated graphical user interface 415, one or more microphone(s) 416, attached microscope 417 and/or optical slide-reader hardware for image-based biological sample constituent analysis, and including one and/or more camera(s) 418.

A user may initialize the user interface 415 from a computer desktop, application launcher, and/or web browser. The user interface 415 may include one or more screen that display user interactable menus, settings, file directories, and options. The user interface 415 may load source code from local memory, and/or from a remote system over a network connection 406, and may allow a user to open, upload, download, and/or view user data 434, such as images or micrographs, user annotations 436, predictive data 435, models 432, or user models 433.

When processing user data 434 for constituent analysis, the user may load an image from a local and/or remote memory location. User metadata, as a type of user data 434, may be entered by the user and may comprised of user-provided information, such as image and/or micrograph, composition descriptors, file names, sample names, sample types, sample compositions, and others. A user may select one or more models 432 for constituent detection, which can direct the preprocessing and processing of biological data. Model 432 selection may be performed by searching a database of available models 432 based on any number of search criteria, including micrograph parameters, constituent class and/or descriptor, type machine learning technology, and previously-generated user models 433. Additionally, model 432 selection may be conducted automatically through an additional machine learning model(s) and/or algorithm designed to detect probable image constituent classification(s) and/or determine the probability of accurate results based on constituent morphology and/or other characteristics using various detection models on the remote system 404.

User data 434 and model selection 432 may be transmitted to a remote system (as described in FIG. 1) over a network connection 406 for preprocessing and processing of biological data with one or more machine learning or computer vision models for generation of predictive data 435, which may include locations of constituents within user data 434. The remote system may use programmatic language translators to automatically generate files that describe the coordinate location of constituents, which can be stored in memory on the remote system in association with user data 434, and transmitted over a network connection 406 to the electronic device 402 and displayed on the user interface 415.

Predictive data 435, including the image locations of biological constituents detected by models 433 may be overlayed on user images or micrographs in the user interface 415. As shown in FIG. 4, predictive data 435 may take the form of an N-gon shaped bounding boxes around constituent locations, but may also include a colored masking layer in the shape of the target constituent, a boarder around the shape of the target constituent, a label, a line, an arrow, and/or other data that could indicate the predicted location, predicted classifications, and/or other predicted data of target constituent.

A user may then review the predictive data 435 and add, alter, delete, and/or otherwise change the predictive data 435, which can be saved as user annotations 436. For example, user annotations 436 can encompass all predictive data 435 that not been moved and/or altered by the user, excluding data that was deleted by the user, and including data that has been moved and/or altered or added by the user. A user may interact with the user interface 415 to preform annotation manipulation with a keyboard 411, computer mouse 413, finger on a touch screen 420. The user may also interact with the user interface 415 to preform annotation manipulation through hand and/or signaling commands directed to a camera 418, use audible commands directed to a microphone 416 connected to the electronic device, and/or any other form of human interaction with the hardware. For example, the user may vocally command the user interface to delete the predicted location of an image constituent by saying an identifying label and/or location of the predictive data 435, and saying the word "delete."

Saving of user annotations 436 may include generating a JavaScript object notation (JSON) file, other machine readable, and/or human readable file formats corresponding to the annotation data. For example, generating the characteristics data may include generating a feature formatted for input into the model utilizing a JSON, XML, and/or CSV file. User annotations 436 can be saved locally to memory 414 on the electronic device 402 and/or transmitted over a network connection 406 to the remote system, where the user annotations 436 can be saved in memory in association with previously stored user data 434 and predictive data 435.

FIG. 5 illustrates a web service, which allows remote services to be called over a network 506 where a server endpoint may invoke on the remote system 504. This system may be designed for receiving and processing user data through an API Gateway that can function as the client entry point from the electronic device 502 to the remote system 504. User data may include images or micrographs of a biological sample for processing by the remote system.

The remote system 504 may include components such as, for example, web server(s) and inference server(s), incorporating one or more processors, network interface controllers, and databases. The remote system 504 may include inbound and outbound data interfaces for computational processing of user data. Server functions can be called by the API Gateway and the function can interact with other downstream services. User credentialing and access can be managed by a license registry hosted on the remote system servers and databases. In-memory cache can queue inference requests and signal request completion.

Data sent to the remote system (the "client request") may be received by an API Gateway and routed to an available API Endpoint server, which may be designed to specifically process different types of user data, such as type of image or micrograph, and/or classification of image constituent. For instance, user data sent to the remote system 504 (the "client request") described with respect to the components of the web service may utilize common internet hypertext Transfer Protocol (HTTP), such as GET, POST, PUT, DELETE, and others, to enable messages over one or more network connections between the client and remote system 504.

API Endpoints may direct user data to Storage Layer servers that could be comprised of transient memory for storing Request Queues, Relational Databases (RDS) and/or non-relational data bases and/or data lakes, and File Storage systems, such as hard disk drives (HDDs) solid-state drives (SSDs), magnetic storage, and/or other types of storage. User Data queued in Storage Layer servers may then be routed to appropriate Processing Layer servers, which may consist of a scalable array of servers with access to multiple Inference Accelerator servers. Each instance may monitor the work queue and process available client requests.

Virtual server instances with dedicated Inference Accelerator servers may be used for running predictive models. These server instances can manage the work queue and run predictive model inference, returning results to the cloud storage. This component of the remote system 504 software stack can use an instance scaling strategy that guarantees that present remote system resources in distributed geographic areas provide return requests quickly, without using excess resources.

Inference Accelerator servers may process biological data with one or more machine learning and/or computer vision models for generation of predictive data, which may include locations of target constituents within user data. The remote system 504 may use programmatic language translators to automatically generate files that describe the coordinate location of constituents, which can be stored in memory on the remote system in association with user data, and transmitted over a network connection 506 to the electronic device 502 and displayed on the user interface.

Figure 6:
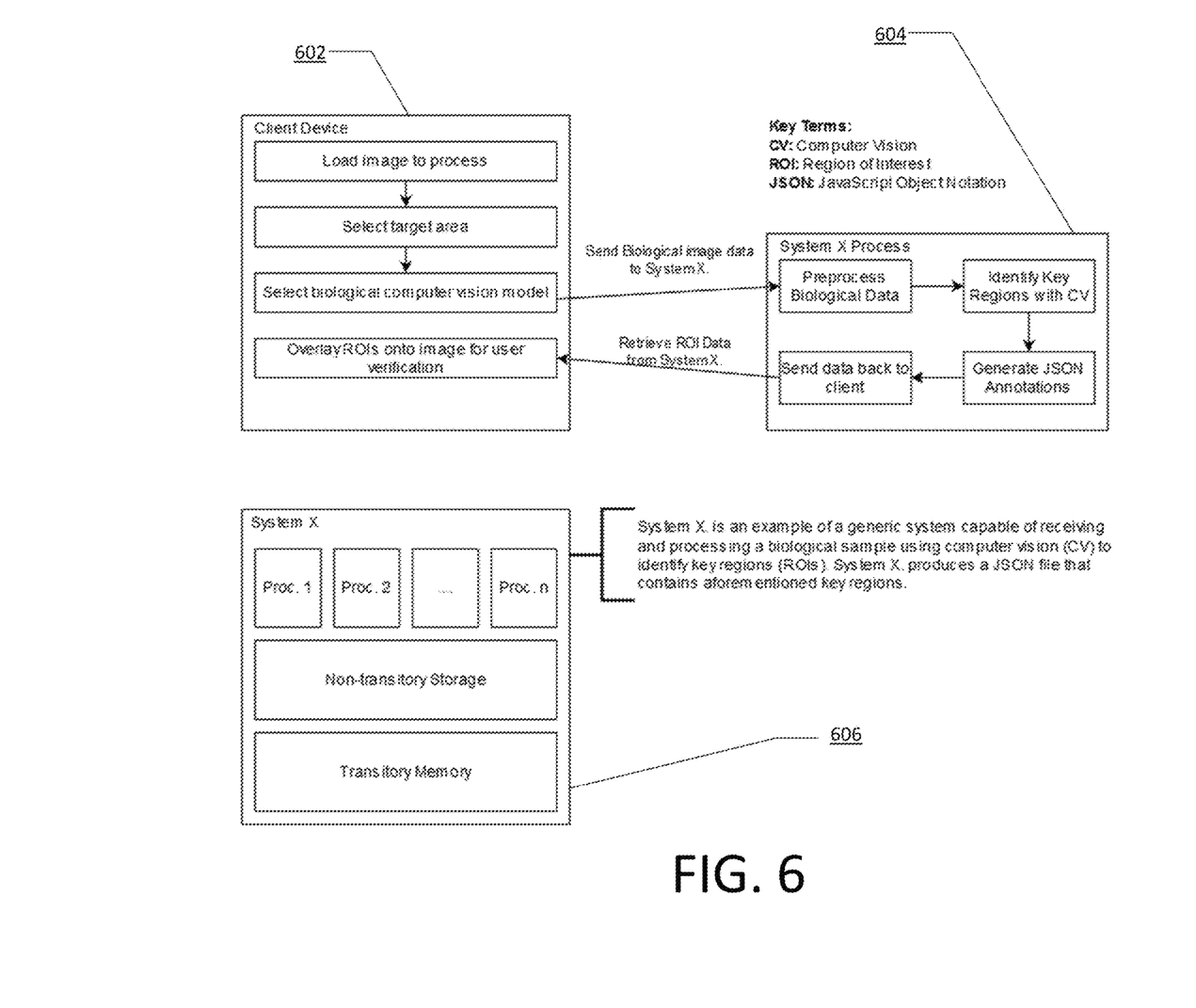
FIG. 6 illustrates a conceptual diagram of example data flow processing between devices and systems for image-based biological sample constituent analysis.

FIG. 6 illustrates a system where the electronic device 602 initiates image processing when the user captures, loads, opens, or otherwise creates user data, such as images or micrographs of a biological sample. The user may then prepare the image for analysis, with the option of selecting a region of the image or micrograph for analysis, and may select a model to be used for constituent detection by computer vision on the remote system 604. Model selection may be completed manually by the user, and/or automatically by machine learning model(s) designed to detect likely image constituent classification(s) and/or probability of accurate results, based on constituent morphology and/or other characteristics, by various detection models on the remote system 604.

The user data may be uploaded via network connection from the electronic device 602 for inference by predictive machine learning models performed by the remote system. The remote system 604 may be include a system of computational functions and/or preprocessing and processing biological data, one or more machine learning and/or computer vision models for prediction of the image locations of constituents.

These user data and predictive data assets may be processed on the system, as illustrated in FIG. 6, subset 606. User data and predictive data assets may be contained in transitory memory, stored in non-transitory storage, and processed using one or many available processing configurations. For example, processing configurations may include Inference Accelerator servers that host models prepared to detect specific biological characteristics and/or morphologies. Programmatic language translators to automatically generate files that describe the coordinate location of constituents, which may be coded using JSON formatting and/or other machine readable, and/or human readable file formats, such as XML or CSV.

Upon completion of target constituent detection by the system 606, user data and predictive data may be stored on the remote system 604 and transmitted back to the device 602 over a network connection. In this way, some or all of the operations described herein may be performed utilizing some or all of the components illustrated in FIG. 6.

Figure 7:
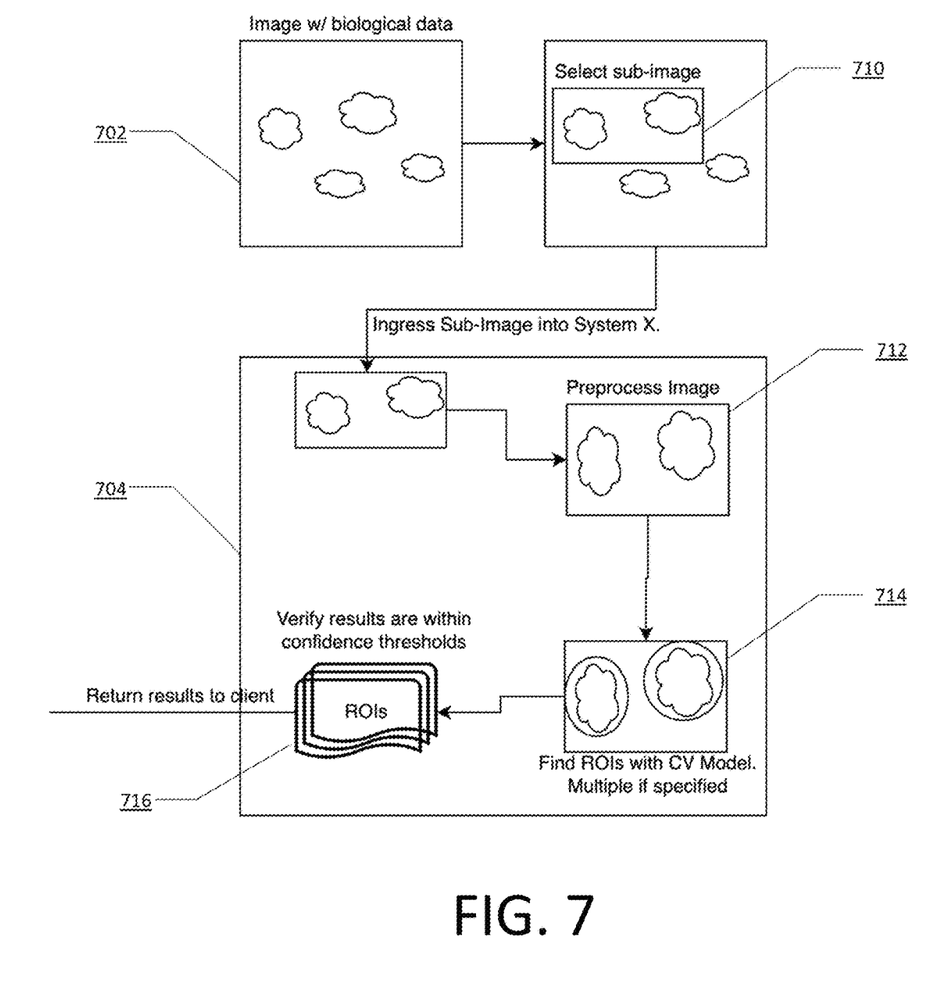
FIG. 7 illustrates a conceptual diagram of example predictive data generated by models during image-based biological sample constituent analysis.

FIG. 7 illustrates this system where the user may upload user data 702, such as images or micrographs, to an electronic device for analysis by predictive machine learning models performed by the remote system 704 and may then return predictive data to the electronic device 702.

When processing user data for constituent analysis, the user may load an image from a local and/or remote memory location onto the device 702. User metadata, as a type of user data, may be entered by the user and may comprised of user-provided information, such as image or micrograph composition descriptors, file names, sample names, sample types, sample compositions, and others. A user may also select a subregion 710 of the image or micrograph, which can act to limit further analysis to only the subsection selected.

A user and/or an algorithm may select a model(s) for constituent detection by interacting with a user interface (described above in FIG. 4), which can direct the preprocessing and processing of biological data. Following image preparation by the user on the device 702 as described above, user data, user metadata, model selection(s), and other data can be transmitted to the remote system 704 over a network connection.

On the remote system 704, user data and image data may be routed through memory, databases, and servers to conduct image preprocessing 712 and processing 714. In this system, images may be preprocessed to improve the accuracy of target constituent detection during image processing. For example, preprocessing 712 may utilize one or more data processing techniques, such as data pooling algorithms, convolutions, resizing images, blurring, sharpening, subdividing, and/or other forms of image manipulation that select reference characteristics of the portion of the image, the reference characteristics including at least one of colors present in the portion of the image, a color pattern of the portion of the image, and/or arrangement of aspects of the portion of the image. In this example, image data can be preprocessed by the system to remove extraneous image data, select targeted image data, improve image data, subdivide large images for processing, and/or improve the accuracy of target constituent detection. Improved target detection accuracy may result from removing color channels outside of the targeted frequency, and/or removing areas of the image outside of the targeted region.

Image processing 714 may utilize characteristic data and a model configured for analysis of a whole image, and/or a sub region of the image data with characteristics that correspond to the reference characteristics. For example, machine learning models used in this computer vision application (the model) may be designed to extract features, including but not limited to edges, abstract shapes, and/or other features of the targeted constituents, which may be accomplished using convolutional neural networks. Edges and features used in detection may be determined algorithmically during the process of "deep learning" by a convolutional neural network, or other machine learning methods and architectures. The model may be trained through the process of backpropagation, in which features extracted by the convolutional networks influence the classification of each pixel in the input image, and verify classification on a pixel-by-pixel basis. Resulting information can be used by a neural network or other machine learning methods and/or architectures to predict the location of target constituents. To develop robust detection capability in images with poor signal to noise ratio, low constituent quality, high constituent concentration, constituent occlusion, partially present constituents, target constituents overlapping with multiple other constituents, and/or other scenarios that complicate detection of the target constituent, model development can be benefitted by selection of an appropriate neural net architecture and/or inclusion of a representative and sufficiently large training sample size. In such an example, once sufficient training has occurred, the model may be able to detect multiple and/or atypical target constituents even when the constituent quality is poor.

Developed models may accurately detected these characteristic features, during image processing 714, in previously unseen examples of the targeted constituents, and result in predictive data that may include the locations, classifications, and/or other identities of the target constituents. In this example, the system may predict the locations, classifications, and/or other identities of the target constituents, and automatically generate a file of the predictive data, which may be stored on the system and transmitted to the device.

Detection of characteristic features, during image processing 714, may also include the tracking of targeted constituents across multiple consecutive, or roughly consecutive image frames. In this example, a detected constituent(s) may be determined to be the same object across image frames through mathematical calculation of the distance "traveled" between frames, the proximity to other objects, the calculated trajectories or headings of the object(s), as well as any other relevant data.

The remote system 704 may use programmatic language translators to automatically generate files containing predictive data 716 that describe the coordinate location of constituents, which can be stored in memory on the remote system in association with user data, and transmitted over a network connection to the electronic device 702 and displayed on the user interface.

Predictive data 716, including the image locations of biological constituents detected by models may be overlayed on user images or micrographs in the user interface. Predictive data 716 may take the form of an N-gon shaped bounding boxes around constituent locations, but may also include a colored masking layer in the shape of the constituent(s), a boarder around the shape of the constituent(s), a label, a line, an arrow, and/or other data that could indicate the predicted location, predicted classifications, and/or other predicted data of image constituents.

FIG. 8 illustrates a system, where user annotations 836 can be used to modify existing machine learning models 832, for creation of user models 833.

In this system, user data 834 may be loaded, prepared, and transmitted from an electronic device 802 over a network connection 806, as described in previous FIGS. User data 834 may include images or micrographs of biological sample, and user metadata, a type of user data, which may be comprised of user-provided information, such as image composition descriptors, file names, sample names, sample types, sample compositions, and others. The remote system 804 may save the user data 834 in memory, preprocess and process the user data 834, and return predictive data 835 to the device 802 over a network connection 806.

Users of the electronic device 802 may then perform additional validity checks and corrections on the user interface (as described in FIG. 4) to predictive data 835 generated by models 832 to correct for possible false positives and/or false negatives, and/or make other changes to the predictive data 835. User annotations 836 may encompass all predictive data 835 that not been moved and/or altered by the user, excluding data that was deleted by the user, and including data that has been moved and/or altered or added by the user. User annotations 836 of predictive data 835 can be recorded to non-transitory storage 814, can be sent back to the remote system 804 and saved with the original user data 834 record, and submitted with the image to a queue to be added to training data for models 832. This step provides an important resource for the ability to quickly generate new predictive data 835 and develop new, and/or modified, user models 833.

Following transmission of user annotations 836 to the remote system 804, user annotations 836 can enter the user annotation queue 837 and then be associated with previously saved user data 834, and predictive data 835, and saved to memory. In order to prevent malicious data and/or data of poor quality from being entered into training of a model, data may undergo validity preprocessing 838. In validity preprocessing 838, a queue of a predetermined dataset size, can be cross-validated by calculating a "closeness factor" based on Intersection of Union (IoU) of the predicted data 835 with user annotations 836, defined as [sum from n=1 to k of (1−IoU_n)]/k where k is the total number of proposed detections (i.e., predictive data 835), where a factor of 0 would be a perfect match to predictive data 835. If the closeness factor is less than a predefined threshold, the data may be added to the dataset and begin precursor model selection 839.

Generation of user models 833 is describes in the Model Creation Workflow in FIG. 8, and may begin with precursor model selection 839, during which, a multi-class object detection and/or segmentation model 832 may be used to predict confidence values of the previously unknown constituent(s). Based on ordinal ranking of constituent class prediction values, a single-class model 832 for the highest probability class, which may be over a certain threshold, can be selected from the model library 840, and used as a starting point for transfer learning from the model 832 to the user model 833. As an alternative, or in addition, constituent-class identification of the unknown class can be calculated as a "thumbprint" of the prediction confidence values. Constituent class thumbprints can be processed using principal component analysis (PCA) and/or k-nearest neighbor (kNN) functions to categorize the prediction confidence thumbprints into user model 833 classes.

Following selection of a precursor model 832 from the model library 840, user data 834 and user annotations 836 can be processed and data from the image library 841 and annotation library 842 ingress, or be combined with, user data 834 and user annotations 836. The model library 840, image library 841, and annotation library 842 may be stored as a relational database, non-relational database, data lake, file directory, or combination thereof. Image set(s) can be selected from the image library 841 based on relationship to the selected precursor model 832 and inclusion to train the precursor model 832. annotation sets can be selected from the annotation library 842 based on relationship to the selected image set(s) and precursor model 832, and inclusion to train the precursor model 832.

Combined image sets with user data 834, and combined annotation sets with user annotations 836 may be used to generate user models 833 based on similar approaches used to develop precursor modes 832, and/or through transfer learning techniques, continuous learning technique, augmentation techniques, and/or other predictive analytic techniques that utilizing statistical techniques to detect associations between factors, and may provide the ability to improve outcome prediction performance without being explicitly programmed to do so. For example, user models 833 may be trained from an automatically determined neural net architectures, based on architecture used by the selected precursor model(s) 832, and from automatically determined hyperparameters, based on hyperparameters used to train the selected precursor model(s) 832.

Predictive analytic techniques may include, for example, predictive modelling, machine learning, and/or data mining. Generally, predictive modelling may utilize statistics to predict outcomes. A number of machine learning and/or data augmentation techniques may be employed to generate and/or modify the models describes herein. Those techniques may include, for example, decision tree learning, association rule learning, artificial neural networks (including, in examples, deep learning and/or generative artificial neural networks), inductive logic programming, support vector machines, clustering, Bayesian networks, reinforcement learning, representation learning, similarity and metric learning, sparse dictionary learning, and/or rules-based machine learning.

This same procedure may be applied to transfer learning from a precursor model 832 that may use to create a biological image detection model 833 that may be applicable to the characteristics of their samples, but not necessarily the characteristics that the precursor model 832 may be capable of detecting.

Successful training of user model(s) 833 may be determined by user validation, automatic cross-validation by calculating an IoU "closeness factor," as described above, between annotations used to train the models and annotations used to test the model, and/or other methods to determine the accuracy of target constituent detection by the user model 833.

Following completion of a user model 833, user data 834 may be included in the image library 841 as new data sets, user annotations 836 may be included in with the annotation library 842 as new annotation sets, and relationships between the image sets, annotation sets, and models may be stored in a database and/or other data storage mechanism. The Computer Vision Workflow in FIG. 8 describes the image analysis system that may result from the Model Creation Workflow, in that the user model 834 may be incorporated into the model library 840 and available for future use by the user, and/or many users of the system. During which, user data 834, such as an image or micrograph, may be included in the image library 841, the user data 834 may be preprocessed, and processed with a model(s) 832 and/or user model(s) 833, and predictive data 835 may be included in the annotation library 842.

While the foregoing invention as described with respect to the specific examples, it is to be understood that the scope of the invention is not limited to these specific examples. Since other modifications and changes varied to fit particular operating requirements and environments may be apparent to those skilled in the art, the invention cannot be considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving, from a device configured to receive a biological sample including a target constituent and one or more other constituents, image data corresponding to an image of the biological sample, wherein the image data is received via a wired or wireless network connection to the device having one or more security protocols in place such that communication between the system and the device is authorized;
receiving, from the device and via the wireless network connection, annotation data indicating user selection of a portion of the image via a graphical user interface displayed on the device, the user selection differentiating the target constituent from the one or more other constituents;

generating characteristic data, utilizing one or more computer vision techniques, indicating reference characteristics of the portion of the image, the reference characteristics including at least one of colors present in the portion of the image, a color pattern of the portion of the image, or arrangement of aspects of the portion of the image;

identifying, utilizing the characteristic data and a model configured for image analysis, portions of the image data with characteristics that correspond to the reference characteristics;

generating, utilizing the model, results data indicating a location of individual ones of the portions of the image; and sending, via the wireless network connection, the results data to the device, the results data, when received at the device, causing the graphical user interface to display an overlay on the image, the overlay including a visual indicator of the location of the individual ones of the portions of the image and quantifying a number of the portions of the image.

2. The system of claim 1, the operations comprising:
generating a JavaScript object notation (JSON) file corresponding to the annotation data; and
wherein generating the characteristics data includes generating a feature formatted for input into the model utilizing the JSON file.

3. The system of claim 1, wherein the model includes a machine learning model, and the operations further comprise:
selecting the machine learning model from one or more machine learning models based at least in part on data received from the device being image data instead of other data types;
generating a training dataset based at least in part on the characteristic data;
training the machine learning model based at least in part on the training dataset such that a trained machine learning model is generated;
generating a testing dataset corresponding to the image data; and
wherein generating the results data is based at least in part on the trained machine learning model utilizing the testing dataset.

4. The system of claim 1, the operations further comprising:
receiving, from the device and via the wireless network connection, feedback data indicating an accuracy of the results data as determined by a user of the device;
generating a training dataset based at least in part on the feedback data;
training the model based at least in part on the training dataset such that a trained model is generated;
receiving additional image data for analysis of the target constituent; and
analyzing the additional image data utilizing the trained model instead of the model.

5. A method, comprising:
receiving image data corresponding to an image of a biological sample;
receiving annotation data indicating a portion of the image associated with a target constituent of the biological sample;

generating first data indicating reference characteristics of the image data corresponding to the portion of the image;

identifying, utilizing the first data and a model configured for image analysis, portions of the image data with characteristics that correspond at least to a threshold degree to the reference characteristics;

generating, utilizing the model, second data indicating a location of individual ones of the portions of the image; and sending the second data to a device, the second data configured to be utilized by the device to display a visual indicator of the location of the individual ones of the portions of the image.

6. The method of claim 5, further comprising:
generating a JavaScript object notation (JSON) file corresponding to the annotation data; and
wherein generating the first data includes generating a feature formatted for input into the model utilizing the JSON file.

7. The method of claim 5, wherein the model includes a machine learning model, and the method further comprises:
selecting the machine learning model from one or more machine learning models based at least in part on an identifier of the target constituent;
generating a training dataset based at least in part on the characteristic data;
training the machine learning model based at least in part on the training dataset such that a trained machine learning model is generated; and
wherein generating the second data is performed utilizing the trained machine learning model.

8. The method of claim 5, further comprising:
receiving feedback data indicating an accuracy of the second data;
generating a training dataset based at least in part on the feedback data;
training the model based at least in part on the training dataset such that a trained model is generated; and
analyzing additional image data utilizing the trained model instead of the model.

9. The method of claim 5, wherein the annotation data comprises audio data, and the method further comprises:
generating text data from the audio data, the text data corresponding to a textual representation of user speech from the audio data; and
determining the reference characteristics based at least in part on the text data.

10. The method of claim 5, wherein:
the image data represents multiple sequential images of the biological sample;
the reference characteristics indicate at least one of a type of movement or a degree of movement of the target constituent; and
the second data indicates identification of the portions of the image data with target constituents having the at least one of the type of movement or the degree of movement.

11. The method of claim 5, wherein the target constituent comprises a first target constituent, the annotation data indicates the first target constituent and a second target constituent, and the method further comprises:
identifying, utilizing the first data and the model, second portions of the image data corresponding to the second target constituent; and
wherein the second data differentiates between a location of individual ones of the second portions of the image data and the location of the individual ones of the first portions of the image data.

12. The method of claim 5, further comprising:
generating a model library configured to store models for analysis of target constituents;
storing the model in the model library in association with an identifier of the target constituent;
generating an interface configured to receive search queries for the models in the model library;
receiving a search query indicating a request for analysis of reference image data for the target constituent; and
identifying, to a device from which the search query was received, the model as being configured to analyze the reference image data for the target constituent.

13. A system, comprising:
one or more processors; and
non-transitory computer-readable media storing computer-executable instructions that, when executed by the one or more processors, cause the one or more processors to perform operations comprising:
  receiving image data corresponding to an image of a biological sample;
  receiving annotation data indicating a portion of the image associated with a target constituent of the biological sample;
  generating first data indicating reference characteristics of the image data corresponding to the portion of the image;
  identifying, utilizing the first data and a model configured for image analysis, portions of the image data with characteristics that correspond at least to a threshold degree to the reference characteristics;
  generating, utilizing the model, second data indicating a location of individual ones of the portions of the image; and
  sending the second data to a device, the second data configured to be utilized by the device to display a visual indicator of the location of the individual ones of the portions of the image.

14. The system of claim 13, the operations further comprising:
generating a JavaScript object notation (JSON) file corresponding to the annotation data; and
wherein generating the first data includes generating a feature formatted for input into the model utilizing the JSON file.

15. The system of claim 13, wherein the model includes a machine learning model, and the operations further comprise:
selecting the machine learning model from one or more machine learning models based at least in part on an identifier of the target constituent;
generating a training dataset based at least in part on the characteristic data;
training the machine learning model based at least in part on the training dataset such that a trained machine learning model is generated; and
wherein generating the second data is performed utilizing the trained machine learning model.

16. The system of claim 13, the operations further comprising:
receiving feedback data indicating an accuracy of the second data;
generating a training dataset based at least in part on the feedback data;
training the model based at least in part on the training dataset such that a trained model is generated; and
analyzing additional image data utilizing the trained model instead of the model.

17. The system of claim 13, wherein the annotation data comprises audio data, and the operations further comprise:
generating text data from the audio data, the text data corresponding to a textual representation of user speech from the audio data; and
determining the reference characteristics based at least in part on the text data.

18. The system of claim 13, wherein:
the image data represents multiple sequential images of the biological sample;
the reference characteristics indicate at least one of a type of movement or a degree of movement of the target constituent; and
the second data indicates identification of the portions of the image data with target constituents having the at least one of the type of movement or the degree of movement.

19. The system of claim 13, wherein the target constituent comprises a first target constituent, the annotation data indicates the first target constituent and a second target constituent, and the operations further comprise:
identifying, utilizing the first data and the model, second portions of the image data corresponding to the second target constituent; and
wherein the second data differentiates between a location of individual ones of the second portions of the image data and the location of the individual ones of the first portions of the image data.

20. The system of claim 13, the operations further comprising:
generating a model library configured to store models for analysis of target constituents;
storing the model in the model library in association with an identifier of the target constituent;
generating an interface configured to receive search queries for the models in the model library;
receiving a search query indicating a request for analysis of reference image data for the target constituent; and
identifying, to a device from which the search query was received, the model as being configured to analyze the reference image data for the target constituent.

* * * * *